(12) United States Patent
Moindron

(10) Patent No.: US 6,894,575 B2
(45) Date of Patent: May 17, 2005

(54) HIGH-VOLTAGE OSCILLATOR HAVING A FAST RESPONSE TIME

(75) Inventor: Laurent Moindron, Notre Dame d'Oe (FR)

(73) Assignee: STMicroelectronics S.A., Montrouge (FR)

( * ) Notice: Subject to any disclaimer, the term of this patent is extended or adjusted under 35 U.S.C. 154(b) by 168 days.

(21) Appl. No.: 10/325,432

(22) Filed: Dec. 19, 2002

(65) Prior Publication Data

US 2003/0132810 A1 Jul. 17, 2003

(30) Foreign Application Priority Data

Dec. 28, 2001 (FR) .............................................. 01 17037

(51) Int. Cl.[7] .............................. H03B 5/20; H03B 5/24
(52) U.S. Cl. .......................... 331/151; 331/71; 331/111; 331/143; 315/226
(58) Field of Search ....................... 331/71, 111, 113 R, 331/117 R, 117 FE, 117 D, 143, 151, 167; 315/209 R, 226

(56) References Cited

U.S. PATENT DOCUMENTS

| 4,488,214 A | | 12/1984 | Chambers |
| 4,677,347 A | * | 6/1987 | Nakamura ............... 315/241 P |
| 4,967,332 A | | 10/1990 | Claydon et al. |
| 5,099,202 A | | 3/1992 | Claydon et al. |
| 5,227,961 A | | 7/1993 | Claydon et al. |
| 5,761,055 A | | 6/1998 | Okada et al. |
| 6,002,213 A | | 12/1999 | Wood |

FOREIGN PATENT DOCUMENTS

GB       1160803 A     8/1969

OTHER PUBLICATIONS

French Search Report from French Priority application No. 0117037, filed Dec. 28, 2001.

* cited by examiner

*Primary Examiner*—David Mis
(74) *Attorney, Agent, or Firm*—Lisa K. Jorgenson; James H. Morris; Wolf, Greenfield & Sacks, P.C.

(57) ABSTRACT

A high-voltage oscillator including a first normally-on switch in series with a resonant circuit, a second normally-on switch in parallel with the resonant circuit, and a control circuit preventing the simultaneous conduction of the two switches.

35 Claims, 3 Drawing Sheets

HIGH-VOLTAGE OSCILLATOR HAVING A FAST RESPONSE TIME

BACKGROUND OF THE INVENTION

1. Field of the Invention

The present invention relates to a high-voltage oscillator, that is, an oscillator able to operate with supply voltages that can reach several hundreds of volts.

2. Discussion of the Related Art

An example of application of the present invention relates to supply systems intended to provide a regulated D.C. voltage. Among conventional solutions in this supply application, transformer systems, which have the disadvantage of being heavy, bulky, and expensive, and switched-mode converter type systems are known. Switched-mode power supplies have as remarkable disadvantages a power dissipation originating from the fact that the cut-off switch generally has an abrupt switching (MOS or IGBT transistor), and the absence of a voltage provided as soon as the circuit is started or connected. It is indeed generally necessary for an auxiliary power supply of a control circuit to provide a sufficient power to control the supply voltage cut-off switch.

An example of a power supply where a high-voltage oscillator is used relates to the field of compact fluorescent lamps (CFL). The fluorescent tube supply is generally obtained by means of an H-shaped half-bridge controlled either by a transformer, or by an integrated circuit oscillator. In this last case, a voltage reference problem for the control of the transistor of the upper bridge branch is posed, which requires use of a level shifter.

The present invention will be described hereafter in more specific relation with an application to a supply circuit. It should however be noted that it more generally applies in all fields where a high-voltage oscillator may be required. For example, these may be applications to induction power transfer, such as wireless battery chargers or induction hot plates.

SUMMARY OF THE INVENTION

The present invention aims at providing a high-voltage oscillator capable of starting from as soon as the power-on, that is, as soon as it receives a supply voltage.

The present invention also aims at easing the possible filtering of the circuit input to reduce electromagnetic disturbances.

The present invention also aims at providing an oscillator with a low power dissipation as compared to known switched-mode systems in power supplies.

The present invention further aims at reducing the oscillator bulk.

In its application to supply systems, the present invention further aims at solving the problems of voltage reference for the switching component control.

To achieve these and other objects, the present invention provides a high-voltage oscillator including:

a first normally-on switch in series with a resonant circuit;

a second normally-on switch in parallel with the resonant circuit; and a control circuit preventing the simultaneous conduction of the two switches as soon as the oscillator is powered on.

According to an embodiment of the present invention, the oscillator includes a single resonant circuit.

According to an embodiment of the present invention, the control circuit has no auxiliary supply circuit.

According to an embodiment of the present invention, said first switch is on during periods of recharge of a capacitor of the series resonant circuit, and is off during a resonance phase.

According to an embodiment of the present invention, the control of the first switch is performed by comparing the voltage across the resonant circuit with a predetermined threshold.

According to an embodiment of the present invention, the control of the second switch is performed by delaying the turn-on time of this switch with respect to the end of the conduction of the first switch.

According to an embodiment of the present invention, said switches are bidirectional in current and voltage.

According to an embodiment of the present invention, said switches are one-way switches.

According to an embodiment of the present invention, the oscillator includes a free wheel diode, reverse biased with respect to the second switch.

According to an embodiment of the present invention, the resonance phase includes a first cycle of discharge of said capacitor through the second switch and a second cycle of discharge of said capacitor through said free wheel diode.

According to an embodiment of the present invention, the second switch is formed of a thyristor having its anode connected on the side of the first switch.

According to an embodiment of the present invention, the first switch is formed of an NPN-type bipolar transistor made normally on by the connection of its base and of its collector by means of a resistor, the emitter of the bipolar transistor being connected to the resonant circuit.

The present invention also provides a D.C. supply circuit including a high-voltage oscillator.

According to an embodiment of the present invention, an output capacitor is connected, in parallel with two rectifying diodes in series, to the second capacitor.

According to an embodiment of the present invention, a first rectifying diode connects one end of the resonant circuit to an electrode of the second switch and to a positive electrode of the output capacitor, the anode of the first rectifying diode being connected to the resonant circuit and to the cathode of a second rectifying diode connected to the free wheel diode.

According to an embodiment of the present invention, the biasing of the output voltage is chosen according to the electrode of the output capacitor to which is connected the reference of the supply voltage.

According to an embodiment of the present invention, the supply circuit includes a control circuit having the function of delaying the time of starting of the second switch according to the output voltage.

The foregoing objects, features and advantages of the present invention, will be discussed in detail in the following non-limiting description of specific embodiments in connection with the accompanying drawings.

DETAILED DESCRIPTION

Figure 1:
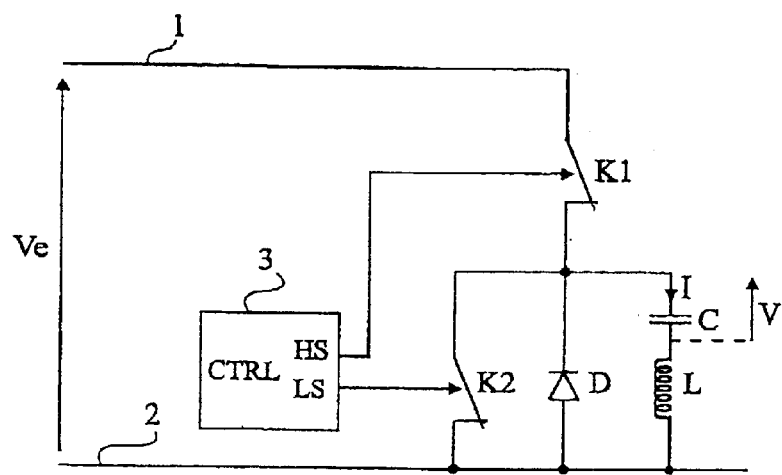
FIG. 1 shows in a very simplified view an embodiment of a high-voltage oscillator according to the present invention.

The same elements have been designated with same references in the different drawings. For clarity, only those elements that are necessary to the understanding of the present invention have been shown in the drawings and will be described hereafter. In particular, the circuits providing the supply voltage of a high-voltage oscillator according to the present invention have not been detailed. Similarly, the downstream circuits exploiting the oscillating signal of the present invention and especially the circuits that it supplies are not illustrated.

FIG. 1 very schematically shows an embodiment of an oscillator according to the present invention.

A first switch K1 is in series with a capacitor C and an inductance L between two terminals 1 and 2 of application of a supply or input voltage Ve. A diode D is connected in parallel with resonant circuit C-L. A second switch K2 is also in parallel with resonant circuit C-L, and thus in parallel with diode D, the anode of diode D being connected to terminal 2.

A feature of the present invention is to use switches K1 and K2 of normally-on type. Another feature of the present invention is to share a same series resonant circuit (inductance L and capacitor C) for all circuit operating phases.

Switches K1 and K2 are controlled by a circuit 3 providing two distinct signals HS and LS for respective switches K1 and K2.

According to a first embodiment, switches K1 and K2 are bidirectional in current and voltage, that is, able to withstand a high on-state voltage, whatever its biasing and to be conductive in both directions in the on state. In this case, diode D is omitted. If the input voltage is an A.C. voltage, the circuit then operates during all halfwaves.

According to a second embodiment, switches K1 and K2 are one-way switches (at least functionally by means of control circuit 3). Accordingly, if input voltage Ve is an A.C. voltage (for example, the voltage of the electric supply mains), the oscillator only operates during positive (or negative) halfwaves of the A.C. power supply.

Other configurations are possible, provided to respect the use of normally-on switches and the absence of a simultaneous conduction of switches K1 and K2. For example, switch K2 may be bidirectional in current and unidirectional in voltage (case of a MOS transistor). In this case, diode D is short-circuited by the turning-on of switch K2.

According to the present invention, circuit 3 is configured to, as soon as the oscillator is powered on, prevent a simultaneous conduction of switches K1 and K2, which would result in short-circuiting the power supply. Switch K1 is essentially used to cause the recharge of capacitor C of the resonant circuit from voltage Ve while switch K2 enables using the resonant circuit to discharge capacitor C, by means of free wheel diode D if switch K2 is unidirectional.

Figure 2A:
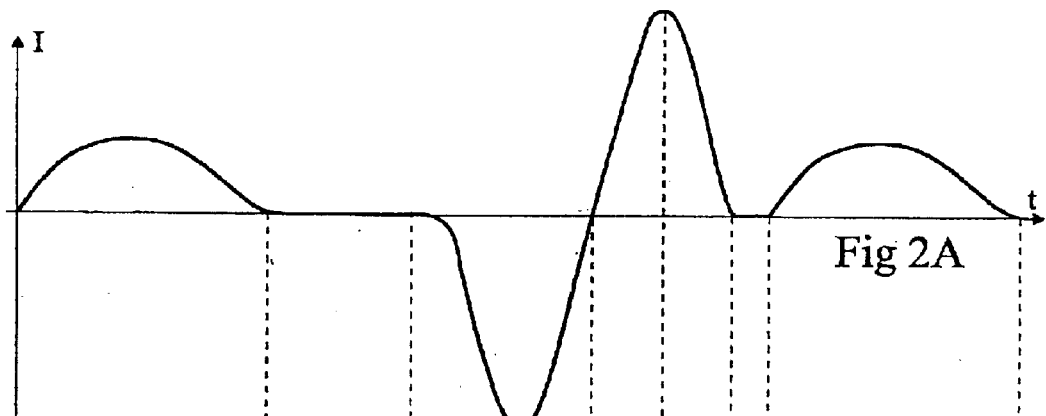
FIGS. 2A, 2B, 2C, and 2D illustrate, in the form of timing diagrams, the operation of a high-voltage oscillator according to the present invention.
Figure 2B:
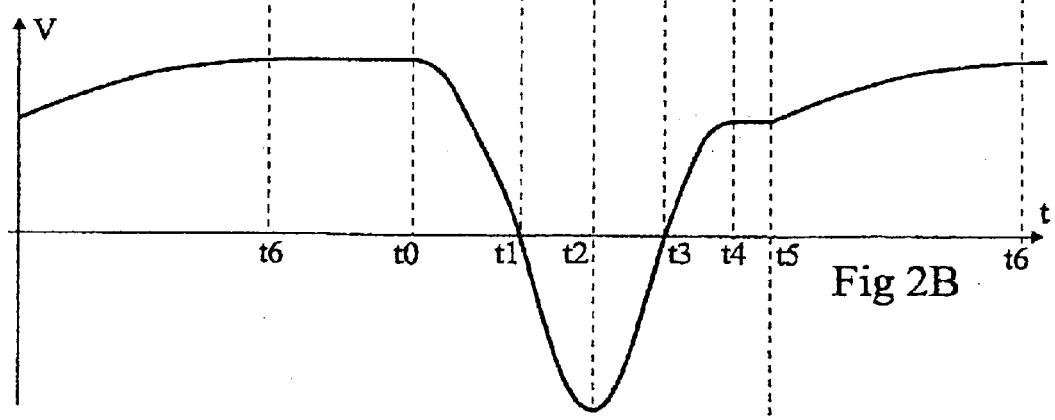
Figure 2C:
Figure 2D:
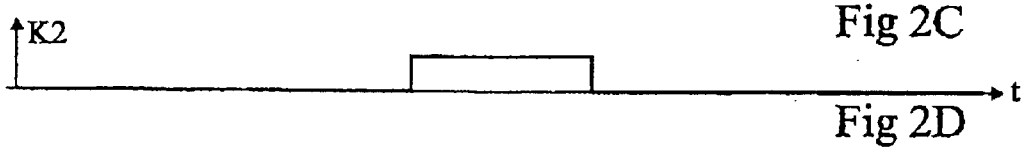

FIGS. 2A to 2D illustrate, by timing diagrams, the operation of a high-voltage oscillator according to the present invention. FIG. 2A shows an example of shape of current I in the resonant circuit. FIG. 2B illustrates the shape of voltage V across capacitor C. FIG. 2C illustrates the on periods of switch K1. FIG. 2D illustrates on periods of switch K2.

The operation of a high-voltage oscillator according to the present invention may be broken up into two successive phases respectively corresponding to the discharge and the recharge of capacitor C. The embodiment of FIG. 1 may for example be taken, but this operation transposes to the case where the switches are bidirectional.

Capacitor C is assumed to be initially charged and switch K2 is assumed to be triggered (turned on) at a time t0. This operation assumes that switch K1 has previously been turned off under the action of control circuit 3. Due to the previously-discussed biasings, capacitor C is, at time t0, positively charged (FIG. 2B). Diode D is thus off. The discharge of capacitor C occurs through switch K2.

When the capacitor has entirely discharged (time t1), current I is then maximum in inductance L (negative maximum with the conventions taken on the drawings). The inductance then behaves as a current generator and negatively recharges capacitor C with the conventions of the drawings.

When current I becomes zero (time t2), switch K2 is turned off. Capacitor C then discharges through inductance L and diode D.

When the voltage across capacitor C becomes zero (time t3), current I in inductance L is maximum (positive maximum with the conventions of the drawings). Inductance L then behaves again as a current generator and positively recharges capacitor C.

The previously-discussed resonance mechanism thus starts with a conduction cycle of switch K2 and ends with a conduction cycle of diode D. It should be noted that diode D may be formed of another synchronized switch, be combined to switch K2 (parasitic diode) if the latter is sufficiently fast, or be replaced with the conduction of switch K2 if the latter is bidirectional in current.

During the conduction period of diode D (times t2 to t4), control circuit 3 must force the turning-off of switch K2, switch K1 remaining off during the entire resonance phase.

A second operating phase of the oscillator of the present invention is the recharge of capacitor C from supply voltage Ve. Indeed, part of the power initially stored in capacitor C has been dissipated during the preceding resonance phase or consumed by the load (not shown). Voltage level V thus is, at time t4, smaller than the level of time t0. The aim of the second operating phase is to recharge capacitor C to its initial level.

For this purpose, switch K1 being a normally-on switch, it naturally turns on as soon as its off-state is no longer forced by the control circuit (time t5). Capacitor C is thus recharged through inductance L in series. The current sampled from the supply voltage source here corresponds to a half sinusoidal halfwave (times t5 to t6). Preferably, switch K1 is chosen so that its turning-off naturally occurs when the current flowing therethrough becomes zero to avoid overvoltages due to this turning-off. In this case, the control of switch K1 is particularly simplified, as well as the filtering against electromagnetic disturbances generated by the cutting-off of the current sampled from the power supply.

In the second operating phase, control circuit 3 forces the turning-off of switch K2 to avoid for both switches K1 and K2 to simultaneously conduct.

The intervals between times t6 and t0 and t4 and t5 may be eliminated. This depends not only on the control circuit, but also on the power consumed by the supplied circuit.

The foregoing description already shows that a high-voltage oscillator according to the present invention has several advantages.

A first advantage is that the turning-off of switch K2 is performed while no current flows therethrough (time t2). It thus is a switching at the current zero, which results in an easier filtering if necessary.

Another advantage is that the oscillator may operate with an A.C. input voltage as well as with a D.C. input voltage.

Another advantage is that a single resonant circuit (and thus, a single inductive element) is sufficient for the two resonance phases linked to the oscillating circuit recharge.

An advantage of using normally-on switches is that this reduces power consumption losses. Another advantage is that this also reduces the necessary control currents, and requires no auxiliary power supply to start the circuit.

Figure 3:
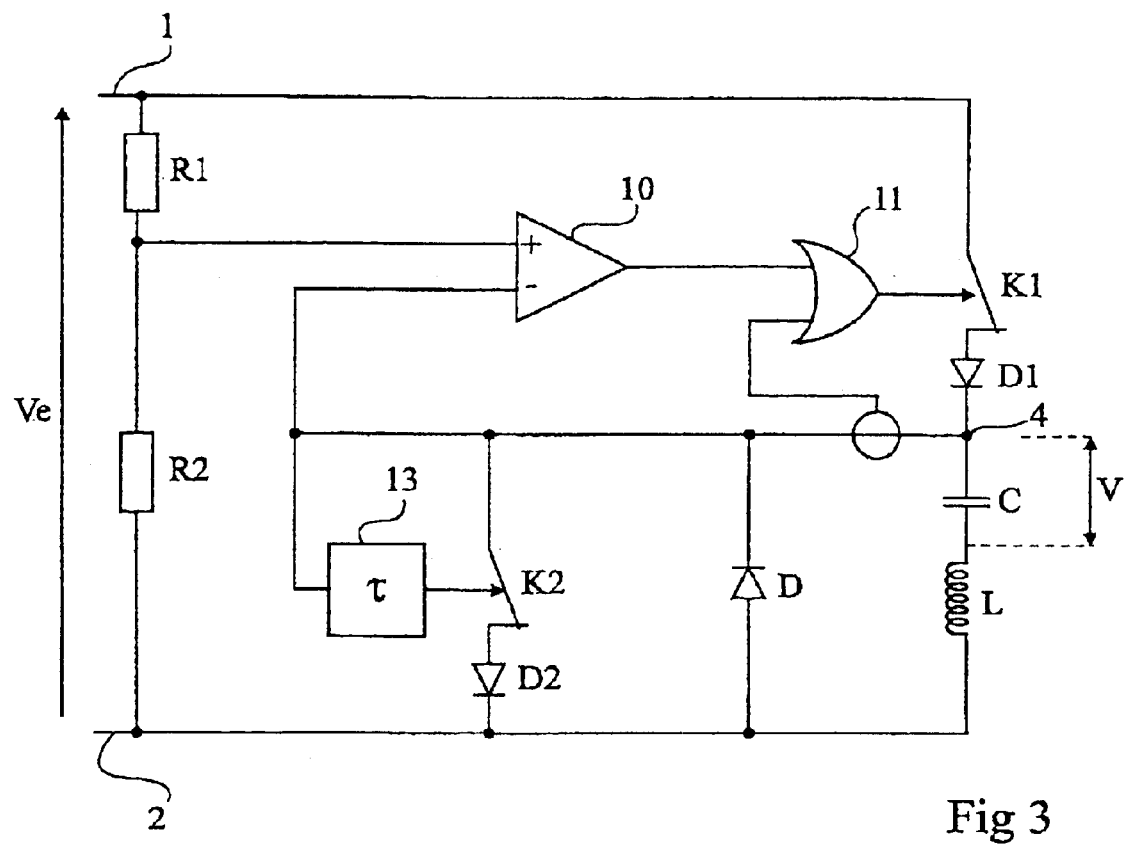
FIG. 3 shows a high-voltage oscillator according to an embodiment of the present invention with a functionally-illustrated control circuit.

FIG. 3 shows an oscillator according to the present invention where the control circuit has been functionally illustrated. It should be noted that this may however correspond to a practical realization, even if this is not a preferred embodiment due to the local supply needs of the logic gates and amplifiers used.

In FIG. 3, the case of unidirectional switches K1 and K2 is considered. This unidirectionality has been symbolized by diodes D1 and D2 respectively in series with each of these switches, the respective anodes of diodes D1 and D2 being directed towards terminal 1 of application of input voltage Ve assumed to be the positive terminal.

The embodiment illustrated in FIG. 3 provides a comparator 10 receiving, on its inverting input (−), the voltage across the resonant circuit and, on its non-inverting input (+), a threshold voltage set, for example, by a resistive dividing bridge R1-R2 connected between terminals 1 and 2, the junction point of resistors R1-R2 being connected to the non-inverting input of comparator 10.

Still according to this embodiment, the presence of a current is detected in switch K2 or in diode D by means of a sensor 12 inserted in the resonant circuit. The two above detection modes may however be used separately, but the double detection brings an additional security.

In the representation of the drawing, the output of comparator 10 is combined by an OR-type gate 11 with the result of the current detection. The output of gate 11 prevents the conduction of switch K1.

During the recharge of capacitor C by the turning-on of switch K1, it must be ascertained that switch K2 is off. For this purpose, a delay element 13 delaying the turning-on of switch K2 with respect to the turn-on time of switch K1 may be provided. Delay τ of circuit 13 is chosen to wait until the end of the conduction of switch K1 before allowing the turning-on of switch K2.

Figure 4:
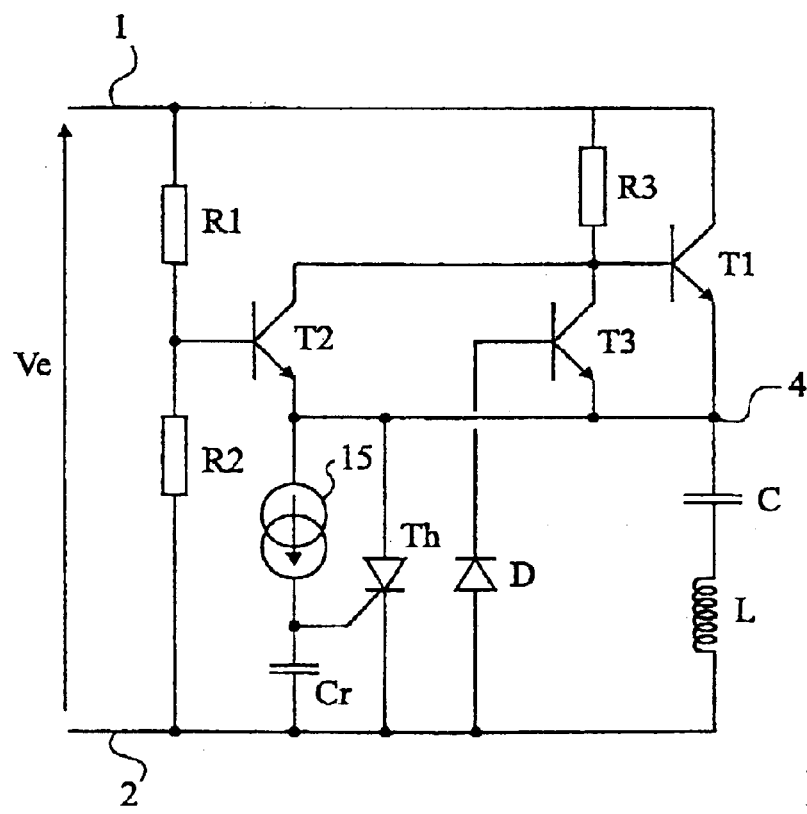
FIG. 4 shows an embodiment of a high-voltage oscillator and of its control circuit according to the present invention.

FIG. 4 shows the electric diagram of another embodiment of a high-voltage oscillator.

According to this embodiment, switch K1 of normally on type is formed of an NPN-type bipolar transistor T1 having its base and its collector connected by a starting resistor R3. The emitter of transistor T1 is connected to node 4 and the collector of transistor T1 is connected to terminal 1.

Switch K2 here is formed of a thyristor Th having its anode connected to node 4 and its cathode connected to terminal 2.

Comparator 10 is formed of an NPN-type bipolar transistor T2 having its base connected to the midpoint of the series connection of resistors R1 and R2, its collector connected to the base of transistor T1, and its emitter connected to node 4.

Current detector 12 (which here detects the current in diode D and not in the entire oscillating circuit as in FIG. 3) is formed of an NPN-type bipolar transistor T3 having its collector connected to the base of transistor T1 and its emitter connected to node 4, the base of transistor T3 being connected to the cathode of diode D which is no longer directly connected to node 4. Transistor T3 operates in switched mode (off-saturated) and can thus be considered, when on, as a diode (base-emitter junction) in series with diode D between terminals 2 and 4 for the free wheel function. Further, when on, it turns off transistor Ti by diverting its base current.

The OR function (11, FIG. 3) is implemented by the direct interconnection of the collectors of transistors T2 and T3 to the base of transistor T1.

The delay element preventing the conduction of thyristor Th when transistor T1 is on here is formed of a current source 15 in series with a capacitor Cr connected between terminals 4 and 2. The midpoint of this series connection is connected to the gate of thyristor Th. As soon as the resonance of the lower stage ends, that is, as soon as transistor T1 is turned on (time t5), capacitor Cr is charged at constant current by source 15. This generates the desired delay for the starting of thyristor Th. Further, capacitor Cr prevents an untimely starting of the thyristor under the effect of the voltage rise at the end of the resonance. Indeed, when a current flows through diode D (between times t2 and t3, FIG. 2), capacitor Cr is negatively charged. Thus, when the voltage reappears across thyristor Th, its gate is negatively biased, which prevents it from starting.

Figure 5:
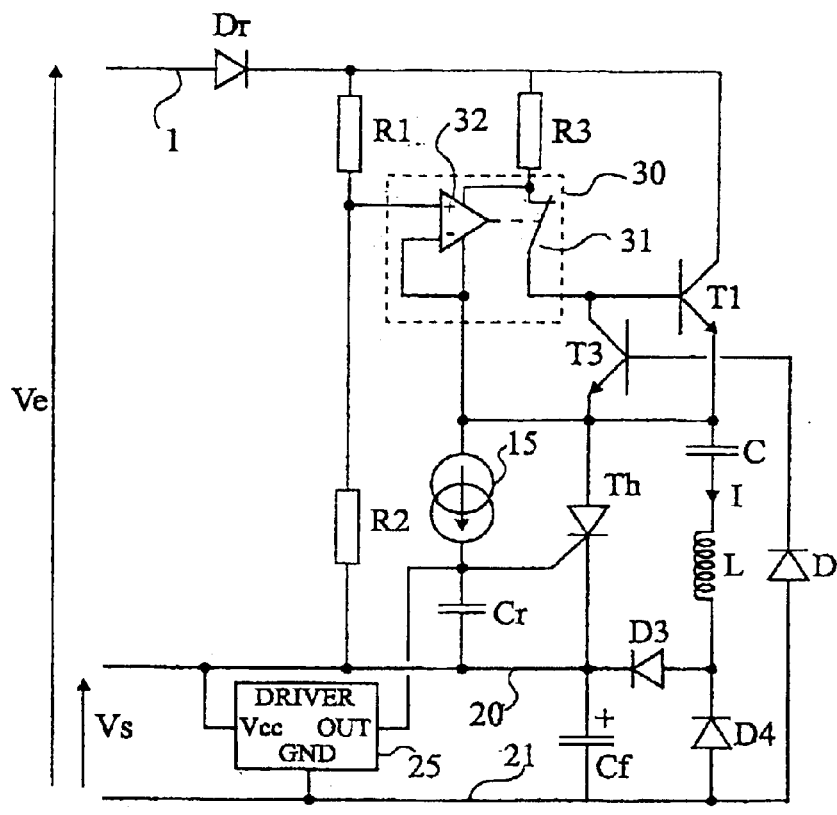
FIG. 5 shows a supply circuit exploiting an oscillator supplied by a high-voltage A.C. voltage according to the present invention.

FIG. 5 shows an embodiment of a supply circuit based on a high-voltage oscillator such as previously described. The circuit is a power supply providing a D.C. output voltage Vs from an A.C. or D.C. input voltage Ve. A halfwave rectifying diode Dr is provided at the circuit input. Voltage Vs is sampled across terminals 20, 21 of a low-voltage filtering capacitor Cf having its positive electrode connected to the cathode of triac Th of the oscillator of the present invention. In the application of a supply circuit, the oscillator load, that is, capacitor Cf, is interposed, associated with two diodes D3 and D4. Diode D3 connects the cathode of thyristor Th to the electrode of inductance L opposite to capacitor C, the anode of diode D3 being connected to inductance L. Diode D4 connects the anode of diode D3 (and thus inductance L) to the anode of diode D, the anode of diode D4 and the anode of diode D being connected together to ground 21.

Due to the connections of diodes D3 and D4, capacitor Cf is charged during all resonance halfwaves, that is, during periods when thyristor Th is on, during periods when the diode is on, as well as during the on periods of transistor T1. Between times t0 and t2 of FIG. 2 (that is, while thyristor Th is on), the charge circuit of capacitor Cf includes diode D4, inductance L, capacitor C, and thyristor Th. Between times t2 and t4 (that is, during the on periods of diode D), the charge circuit of capacitor Cf includes diode D, transistor T3, capacitor C, inductance L, and diode D3.

In an application to a supply circuit, a driver 25 is provided to delay each period of the oscillator according to the output voltage. In other words, the function of driver 25 is to add an additional delay between times t6 and to according to a measurement of output voltage Vs, to control this voltage with a predetermined reference value. With no control circuit, voltage Vs would uncontrollably increase if the power was not consumed by a load connected across capacitor Cf.

Driver 25 may be formed from conventional components, for example, by means of operational amplifiers. Its forming is within the abilities of those skilled in the art based on the functional indications given hereabove. Output terminal OUT of circuit 25 is connected to the gate of thyristor Th to control the delay of its starting. Circuit 25 has its supply terminals (VCC and GND) connected to terminals 20 and 21 of capacitor Cf.

In the embodiment of FIG. 5, an optional current amplifier 30 has been illustrated in series with resistor R3. This current amplifier (buffer) is functionally formed of a switch 31 connected between resistor R3 and the base of transistor T1. Switch 31 is controlled by a comparator 32 having its non-inverting input (+) connected to the junction point of resistors R1 and R2 and having its inverting input (−) connected to the emitter of transistor T3. Comparator 32 is supplied between resistor R3 and the emitter of transistor T3. Current amplifier 30 illustrated by FIG. 5 replaces transistor T2 of FIG. 4. In practice, it may be a Darlington assembly formed from bipolar transistors.

The supply circuit of FIG. 5 may provide a positive or negative output voltage Vs. This only depends on the terminals used between terminals 20 and 21 to connect the reference of supply voltage Ve. Taking as an example an A.C. voltage Ve and a connection of the mains phase to terminal 1, the supply voltage neutral may be connected to terminal 20 or to terminal 21 according to the sign desired for voltage Vs. If the neutral is connected to terminal 20, negative electrode 21 of capacitor Cf will exhibit a more negative voltage, voltage Vs will thus be negative. If the neutral of the A.C. power supply is connected to terminal 21 as shown in FIG. 5, voltage Vs will be positive.

The same line of reasoning applies for a D.C. voltage Ve, according to which terminal 20 or 21 is taken as a reference of this D.C. voltage.

The circuit of FIG. 5 has been described in relation with a voltage charge of capacitor Cf. It should however be noted that this supply circuit also applies to a current charge (for example, to form a driver of an induction heating plate). This result is allowed since the charge current is sinusoidal. Driver 25 then controls the number of current pulses of excitation of the inductive plate.

A supply circuit implementing a high-voltage oscillator according to the present invention has many advantages.

A first advantage is the possibility of operating from an A.C; or D.C. power supply without generating any modification in the supply circuit structure.

Another advantage is to enable positive or negative supply without modifying the supply circuit structure, but by simply changing the connection terminal of the reference potential of the input voltage. This advantage is particularly significant, for example, when triacs are desired to be controlled with negative currents.

Another advantage of the supply circuit of the present invention is that it provides a non-isolated D.C. power supply, which enables controlling, in particular, triacs.

Another advantage of the present invention is that the supply circuit starts as soon as it is powered on.

Indeed, the oscillator of the present invention needs no specific control to start operating. This is due to the fact that the switches used are normally-on switches, which is an important feature of the present invention. Although circuit 25 is not supplied upon power-on of the supply circuit, this does not prevent the high-voltage oscillator from starting to operate.

Another advantage is that the circuit enables, when necessary, use of mains filters of smaller size, due to the current resonance.

It should be noted that, in the case of a supply by an A.C. voltage, the frequency of the high-voltage oscillator of the present invention is much greater than the frequency of the A.C. power supply. In other words, the oscillator of the present invention chops or slices the current with respect to the A.C. power supply. The circuit resonance frequency is set by the respective sizings of capacitor C and of inductance L, as well as by the delays provided for the starting of thyristor Th (times t6 to t0 of FIG. 2). In practice, in the embodiments given by FIGS. 4 and 5 no delay upon starting of transistor K1, that is, between times t4 and t5 in FIG. 2, is provided.

Figure 6:
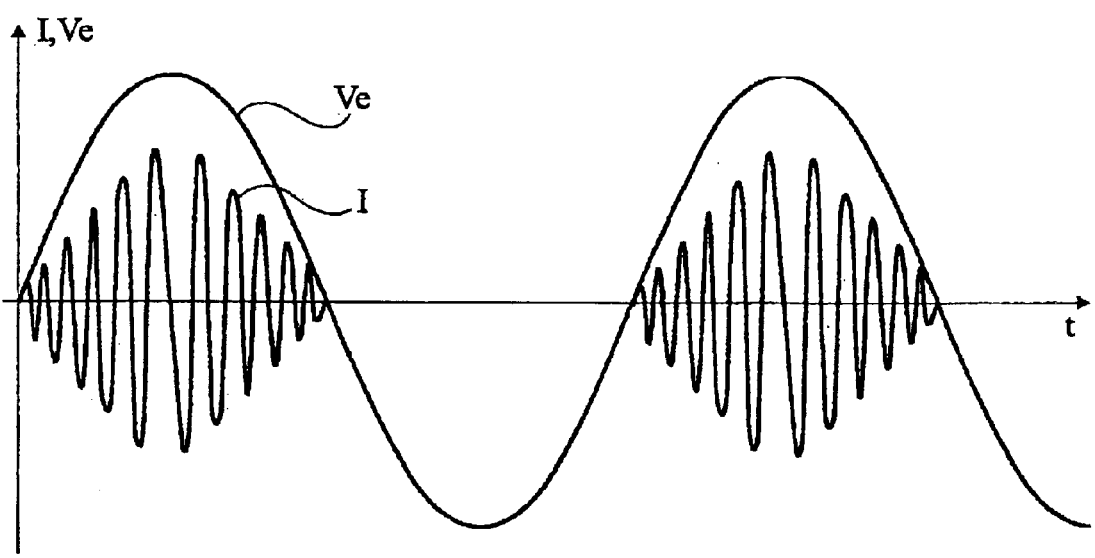
FIG. 6 illustrates, in the form of a timing diagram, the operation of an oscillator according to the present invention.

FIG. 6 illustrates the operation of the supply circuit of FIG. 5 under an A.C. input voltage Ve. FIG. 6 shows the shape of current I in inductance L and the shape of A.C. voltage Ve. As appears from FIG. 6, the oscillator of the present invention only operates during positive halfwaves of voltage Ve, that is, it causes the charge of capacitor Cf during these positive halfwaves only. During said halfwaves, it can be considered that the oscillator of the present invention slices the A.C. supply voltage to charge capacitor Cf. It should however be noted that FIG. 6 has been drawn out of scale, especially as concerns the frequency of the oscillations of current I which is in practice much higher than the frequency of voltage Ve. Each oscillation period of current I corresponds to the period (t6-t5) illustrated in FIG. 2. For example, for a power supply of a few tens of hertz (50 or 60 hertz), a resonance frequency of several tens of kilohertz (for example, 80 kHz) resulting in a cut-off frequency on the order of from 35 to 40 kHz may be provided.

In the case of a D.C. voltage Ve, the slicing of this voltage is permanent.

Of course, the present invention is likely to have various alterations, modifications, and improvements which will readily occur to those skilled in the art. In particular, although the present invention has been more specifically described in relation with an application to a voltage or current supply of a load, it more generally applies to all circuits requiring a high-voltage oscillator.

Further, the sizing of the different components of the oscillator and of the supply circuit is within the abilities of those skilled in the art based on the functional indications given hereabove.

Moreover, other components forming normally-on switches may be used instead of transistor T1 and of thyristor Th. However, the use of a normally-on gate turn-off thyristor (GTO) is a preferred embodiment due to its low cost as compared to a high-voltage MOS transistor or to an IGBT-type transistor. An example of a normally on GTO thyristor is described in U.S. Pat. No. 6,323,718, which is incorporated herein by reference.

Finally, other drivers than that illustrated in FIG. 4 may be implemented as long as the functions described in relation with FIGS. 1 and 3 are respected.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A high-voltage oscillator comprising:
a first normally-on switch in series with a resonant circuit;
a second normally-on switch in parallel with the resonant circuit; and a control circuit preventing the simultaneous conduction of the two switches as soon as the oscillator is powered on.

2. The oscillator of claim 1, comprising a single resonant circuit.

3. The oscillator of claim 1, wherein the control circuit has no auxiliary supply circuit.

4. The oscillator of claim 1, wherein said first switch is on during periods of recharge of a capacitor of the series resonant circuit, and is off during a resonance phase.

5. The oscillator of claim 1, wherein the control of the first switch is performed by comparing the voltage across the resonant circuit with a predetermined threshold.

6. The oscillator of claim 1, wherein the control of the second switch is performed by delaying a turn-on time of this switch with respect to an end of the conduction of the first switch.

7. The oscillator of claim 1, wherein said switches are bidirectional in current and voltage.

8. The oscillator of claim 1, wherein said switches are one-way switches.

9. The oscillator of claim 8, comprising a free wheel diode, reverse biased with respect to the second switch.

10. The oscillator of claim 9, wherein the resonance phase includes a first cycle of discharge of said capacitor through the second switch and a second cycle of discharge of said capacitor through said free wheel diode.

11. The oscillator of claim 8, wherein the second switch is formed of a thyristor having its anode connected on the side of the first switch.

12. The oscillator of claim 8, wherein the first switch is formed of an NPN-type bipolar transistor made normally on by the connection of its base and of its collector by means of a resistor, the emitter of the bipolar transistor being connected to the resonant circuit.

13. A D.C. supply circuit including the high-voltage oscillator of claim 1.

14. The D.C. supply circuit of claim 13, wherein an output capacitor is connected, in parallel with two rectifying diodes in series, to the second capacitor.

15. The supply circuit of claim 14, wherein a first rectifying diode connects one end of the resonant circuit to an electrode of the second switch and to a positive electrode of the output capacitor, the anode of the first rectifying diode being connected to the resonant circuit and to the cathode of a second rectifying diode connected to the free wheel diode.

16. The supply circuit of claim 14, wherein the biasing of the output voltage is chosen according to the electrode of the output capacitor to which is connected the reference of the supply voltage.

17. The supply circuit of claim 13, including a control circuit having the function of delaying the time of starting of the second switch according to the output voltage.

18. A high-voltage oscillator comprising:

a first normally-on switch in series with a resonant circuit;

a second normally-on switch in parallel with the resonant circuit; and means for preventing simultaneous conduction of the two switches as soon as the oscillator is powered on.

19. The oscillator of claim 18, comprising a single resonant circuit.

20. The oscillator of claim 18, wherein the control circuit has no auxiliary supply circuit.

21. The oscillator of claim 18, wherein said first switch is on during periods of recharge of a capacitor of the series resonant circuit, and is off during a resonance phase.

22. The oscillator of claim 18, wherein the control of the first switch is performed by comparing the voltage across the resonant circuit with a predetermined threshold.

23. The oscillator of claim 18, wherein the control of the second switch is performed by delaying a turn-on time of this switch with respect to an end of the conduction of the first switch.

24. The oscillator of claim 18, wherein said switches are bidirectional in current and voltage.

25. The oscillator of claim 18, wherein said switches are one-way switches.

26. The oscillator of claim 25, comprising a free wheel diode, reverse biased with respect to the second switch.

27. The oscillator of claim 26, wherein the resonance phase includes a first cycle of discharge of said capacitor through the second switch and a second cycle of discharge of said capacitor through said free wheel diode.

28. The oscillator of claim 25, wherein the second switch is formed of a thyristor having its anode connected on the side of the first switch.

29. The oscillator of claim 25, wherein the first switch is formed of an NPN-type bipolar transistor made normally on by the connection of its base and of its collector by means of a resistor, the emitter of the bipolar transistor being connected to the resonant circuit.

30. A.D.C. supply circuit including the high-voltage oscillator of claim 18.

31. The D.C. supply circuit of claim 30, wherein an output capacitor is connected, in parallel with two rectifying diodes in series, to the second capacitor.

32. The supply circuit of claim 31, wherein a first rectifying diode connects one end of the resonant circuit to an electrode of the second switch and to a positive electrode of the output capacitor, the anode of the first rectifying diode being connected to the resonant circuit and to the cathode of a second rectifying diode connected to the free wheel diode.

33. The supply circuit of claim 31, wherein the biasing of the output voltage is chosen according to the electrode of the output capacitor to which is connected the reference of the supply voltage.

34. The supply circuit of claim 30, including a control circuit having the function of delaying the time of starting of the second switch according to the output voltage.

35. A method for controlling a high-voltage oscillator including a first normally-on switch in series with a resonant circuit and a second normally-on switch in parallel with the resonant circuit, the method comprising:

preventing simultaneous conduction of the two switches as soon as the oscillator is powered on.

* * * * *